(12) United States Patent
Rempe et al.

(10) Patent No.: US 7,818,954 B2
(45) Date of Patent: Oct. 26, 2010

(54) CORN STALK BALING METHOD AND APPARATUS

(75) Inventors: Scott A. Rempe, Pella, IA (US); Lisle J. Dunham, Grinnell, IA (US); Mark D. Core, Pleasantville, IA (US)

(73) Assignee: Vermeer Manuafcturing Company, Pella, IA (US)

( * ) Notice: Subject to any disclaimer, the term of this patent is extended or adjusted under 35 U.S.C. 154(b) by 0 days.

(21) Appl. No.: 11/743,738

(22) Filed: May 3, 2007

(65) Prior Publication Data

US 2008/0271428 A1 Nov. 6, 2008

(51) Int. Cl.
*A01D 39/00* (2006.01)
(52) U.S. Cl. ...................................... 56/341
(58) Field of Classification Search ............... 56/341, 56/131; 100/87, 88
See application file for complete search history.

(56) References Cited

U.S. PATENT DOCUMENTS

| | | | | | |
|---|---|---|---|---|---|
| 2,096,990 | A | * | 10/1937 | Luebben | 100/88 |
| 2,147,469 | A | * | 2/1939 | Tallman | 56/11.4 |
| 2,720,828 | A | * | 10/1955 | Burns | 100/88 |
| 3,117,406 | A | * | 1/1964 | Hedtke | 56/341 |
| 3,556,327 | A | | 1/1971 | Garrison | |
| 3,665,690 | A | * | 5/1972 | Wenger | 56/341 |
| 3,691,741 | A | | 9/1972 | White | |
| 3,732,672 | A | | 5/1973 | Adee | |
| 3,901,008 | A | * | 8/1975 | Taylor et al. | 56/344 |
| 4,184,312 | A | * | 1/1980 | Oosterling et al. | 56/341 |
| 4,193,251 | A | * | 3/1980 | Oosterling et al. | 56/341 |
| 4,548,131 | A | * | 10/1985 | Williams | 100/1 |

(Continued)

FOREIGN PATENT DOCUMENTS

DE 3821694 1/1990

OTHER PUBLICATIONS 16 page brochure—entitled "Short-chop loader wagons" Euro Boss—by Pottinger.

(Continued)

*Primary Examiner*—Thomas B Will
*Assistant Examiner*—Joan D Misa
(74) *Attorney, Agent, or Firm*—Sturm & Fix LLP (57) ABSTRACT

A method and apparatus for baling a crop with stiff stalks such as corn stalks has a frame with a front and a rear. At least one ground engaging wheel operatively attached to the frame for facilitating movement of the frame in a forward direction. An accumulator is operatively attached to the frame for holding the crop in various amounts. A pickup is operatively attached to the front of the frame for picking up the crop from a field and transferring the crop into the accumulator. A baler is operatively attached to the frame behind the accumulator for transforming a crop into a bale. A transfer mechanism such as a conveyor is provided in the accumulator for moving the crop in the accumulator to the inlet of the baler. In another embodiment, a pickup of a first predetermined width is provided for picking up the crop from a field and transferring the crop into the accumulator. The baler has an inlet and a baling chamber of a second predetermined width that is significantly larger than the first predetermined width of the pickup so that a larger bale can be made. The transfer mechanism can be in segments which are independently operable.

7 Claims, 12 Drawing Sheets

U.S. PATENT DOCUMENTS

| | | | |
|---|---|---|---|
| 4,796,417 A * | 1/1989 | van der Lely | 56/341 |
| 4,910,949 A | 3/1990 | Meyer | |
| 4,951,452 A * | 8/1990 | Lundahl et al. | 56/341 |
| 5,479,766 A * | 1/1996 | Ransom | 56/341 |
| 6,032,446 A * | 3/2000 | Gola et al. | 56/341 |
| 6,263,650 B1 | 7/2001 | Deutsch | |
| 6,421,992 B1 | 7/2002 | Goering | |
| 6,421,996 B1 | 7/2002 | Deutsch | |
| 6,591,743 B2 | 7/2003 | Deutsch | |
| 6,901,732 B2 | 6/2005 | Bares | |
| 6,928,797 B1 * | 8/2005 | Brantley | 56/12.9 |
| 6,938,401 B2 | 9/2005 | Bares | |
| 6,941,740 B2 * | 9/2005 | Fox et al. | 56/341 |
| 6,994,020 B2 * | 2/2006 | Viaud | 100/87 |
| 2003/0093979 A1 * | 5/2003 | Fukumori et al. | 53/587 |
| 2005/0072133 A1 * | 4/2005 | Dubois | 56/341 |
| 2005/0081502 A1 * | 4/2005 | Fox et al. | 56/341 |
| 2005/0086921 A1 * | 4/2005 | Bares et al. | 56/28 |
| 2005/0086922 A1 * | 4/2005 | Bares et al. | 56/30 |

OTHER PUBLICATIONS 4-page brochure showing PhiBer Swath Turners/Mergers—by PhiBer.

* cited by examiner

CORN STALK BALING METHOD AND APPARATUS

FIELD OF THE INVENTION

The present invention relates generally to agricultural equipment, and more specifically to a corn stalk baling method and apparatus.

BACKGROUND OF THE INVENTION

Balers are used for many different crops. Most balers are used to bale hay. Hay is usually classified as any type of grass or legume, such as alfalfa, that is fed to livestock such as cows and horses.

Balers also bale straw, which is the part of the plant above ground that is left after grain such as wheat, oats barley or the like are harvested, for example with a combine harvester. A primary use for straw is for bedding for animals. Straw is also commonly used as mulch for gardens or the like.

A third category of crop material which is baled using a baler is a stiff stalk crop, such as corn stalks, which are typically baled after the corn is removed from the stalk, such as with a combine harvester which saves only the corn kernels or with a corn picker, which saves only the corn while it is still on a cob. It is this third category of crop material which is the most problematic to bale, primarily because of the stiff long pieces of plant stalk. Corn stalks are commonly used as feed for animals, such as cattle, or as a raw material for making a bio-fuel, such as ethanol.

When baling corn stalks, the flow of material is not always a steady flow. Because the corn stalks do not fold together like hay and straw material, sometimes the corn stalks do not flow easily into the baler pickup. This causes the cornstalks to pile up in front of the pickup as the baler is towed through a field, causing a large pile of corn stalks to be pushed along in front of the baler pickup instead of evenly entering the baler. This requires the operator to stop the baler, reorganize the pile of cornstalks in front of the pickup of the baler and resume the baling operation. This problem can occur numerous times during the process of baling a field of cornstalks.

Another problem with baling corn stalks is that the stiff stalks cause inordinate wear on individual components of the baler, especially on the pickup section of a baler as compared to using the baler for baling hay or straw. Consequently those parts need to be replaced more often when baling corn stalks and the baler itself may need to be replaced sooner than if the baler is used to bale only hay or straw.

Accordingly, there is a need for a baler apparatus that overcomes the aforementioned problems with baling crops having a stiff stalk, such as corn stalks.

SUMMARY

The present invention relates to a method and apparatus for baling a crop with stiff stalks such as corn stalks has a frame with a front and a rear. At least one ground engaging wheel operatively attached to the frame for facilitating movement of the frame in a forward direction. An accumulator is operatively attached to the frame for holding said crop in various amounts. A pickup is operatively attached to the front of the frame for picking up the crop from a field and transferring the crop into the accumulator. A baler is operatively attached to the frame behind the accumulator for transforming a crop into a bale. A conveyor is provided in the accumulator for moving the crop in the accumulator to the inlet of the baler.

DETAILED DESCRIPTION OF THE PREFERRED EMBODIMENTS

Figure 1:
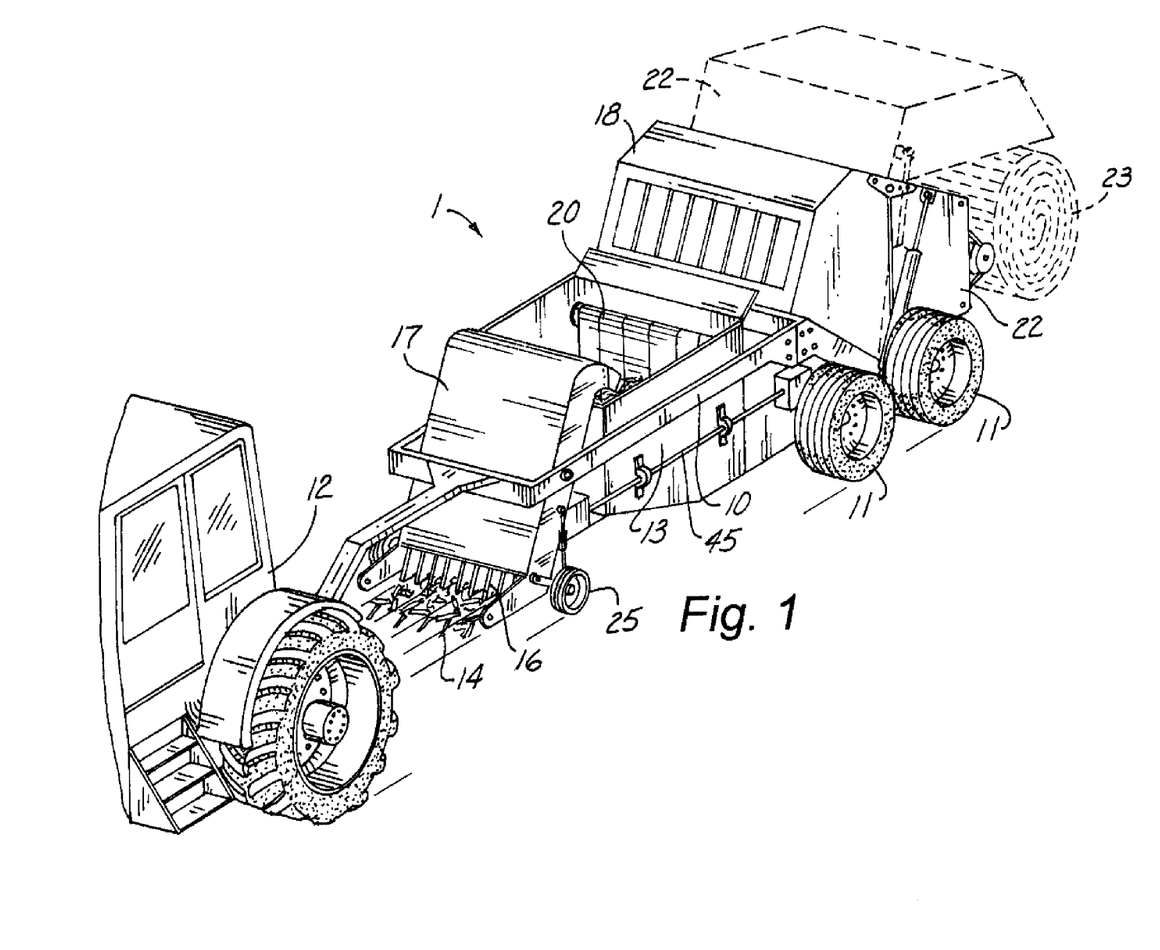
FIG. 1 is a perspective view of a preferred embodiment of a corn stalk baler constructed in accordance with the present invention shown in the process of use and using a first type of pickup device.
Figure 2:
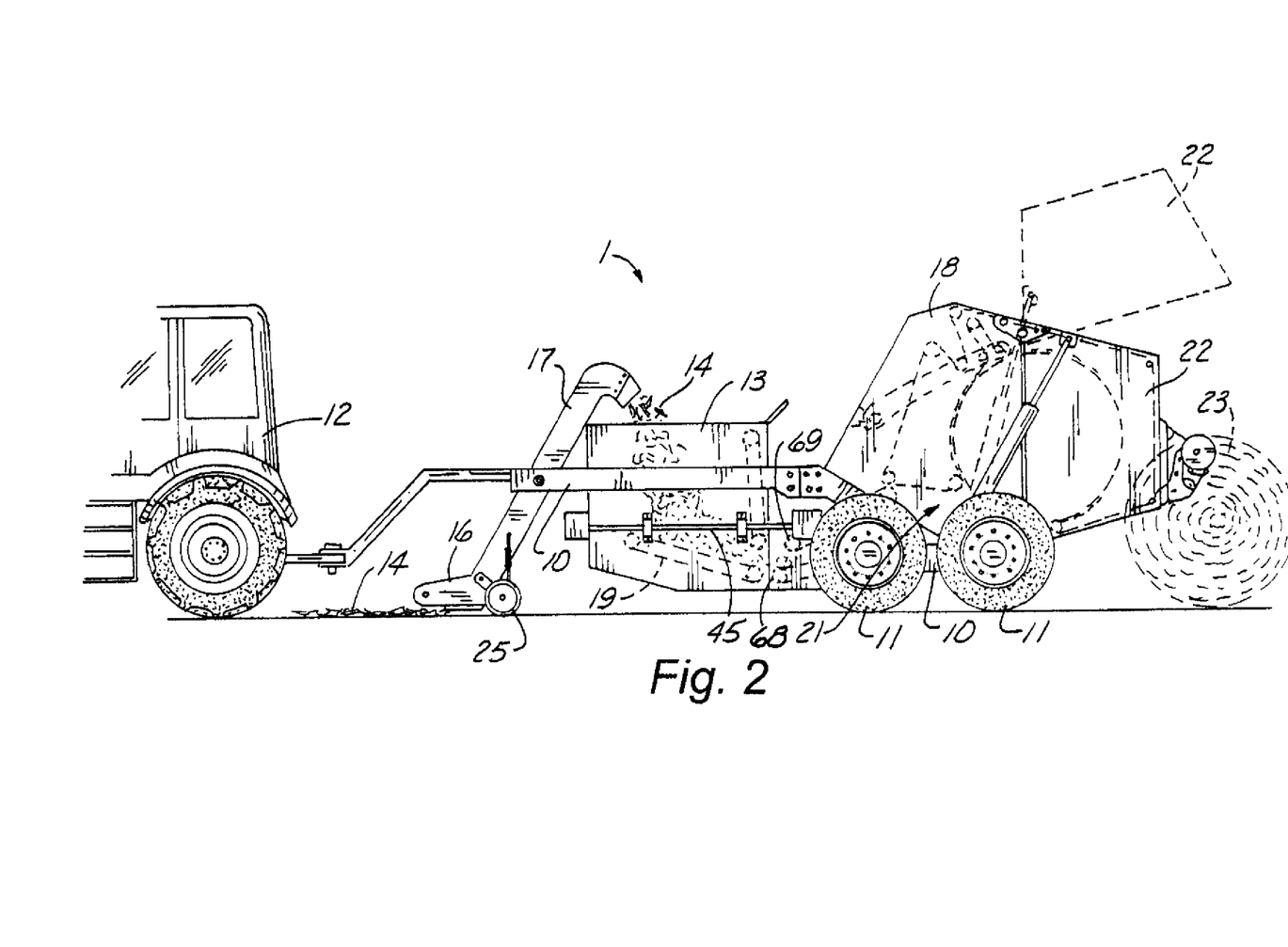
FIG. 2 is a side elevational view of the corn stalk baler of FIG. 1 in use and showing in dashed lines a bale being ejected from the baler.

Referring now to the drawings wherein like reference numerals designate identical or similar parts throughout the several views, a preferred embodiment 1 of the present invention is illustrated in FIGS. 1 and 2. A frame 10 has at least one ground engaging wheel 11 operatively attached to the frame 10 for facilitating movement of the frame 10 in a forward direction towards a towing tractor 12. An accumulator 13 is operatively attached to the frame 10 for holding the crop 14 in various amounts. A pickup 16 is operatively attached to the front of the frame 10 for picking up the crop 14 from a field and transferring the crop, through a chute 17 into the accumulator 13. A baler 18 is operatively attached to the frame 10 behind the accumulator 13 for transforming the crop 14 into a bale. A conveyor, in the form of a set of individual conveyor belts 19 and a second set of individual conveyor belts 20, is provided in the bottom and rear of the accumulator 13 for moving the crop 14 in the accumulator 13 to another pair of conveyor belt sets, 68 and 69, which may compress the material while transferring it to the inlet 21 of the baler 18. The rear end of the baler has a pivoting door 22 which is closed as shown in solid lines when the baler is making a bale and in dashed lines when the door 22 is opened for ejecting a bale 23 from the baler.

The pickup 16 could be like the pickup and chopper/blower shown in U.S. Pat. No. 3,556,327, which has a two stage pickup/chopper or like the pickup of U.S. Pat. No. 3,732,672 to Adee et al., and U.S. Pat. No. 3,691,741 to White et al. which both use a one stage pickup/chopper that picks up a crop from the ground and transfers it into a stacking wagon. All three of these aforementioned patents are incorporated herein by reference in their entirety.

Figure 3:
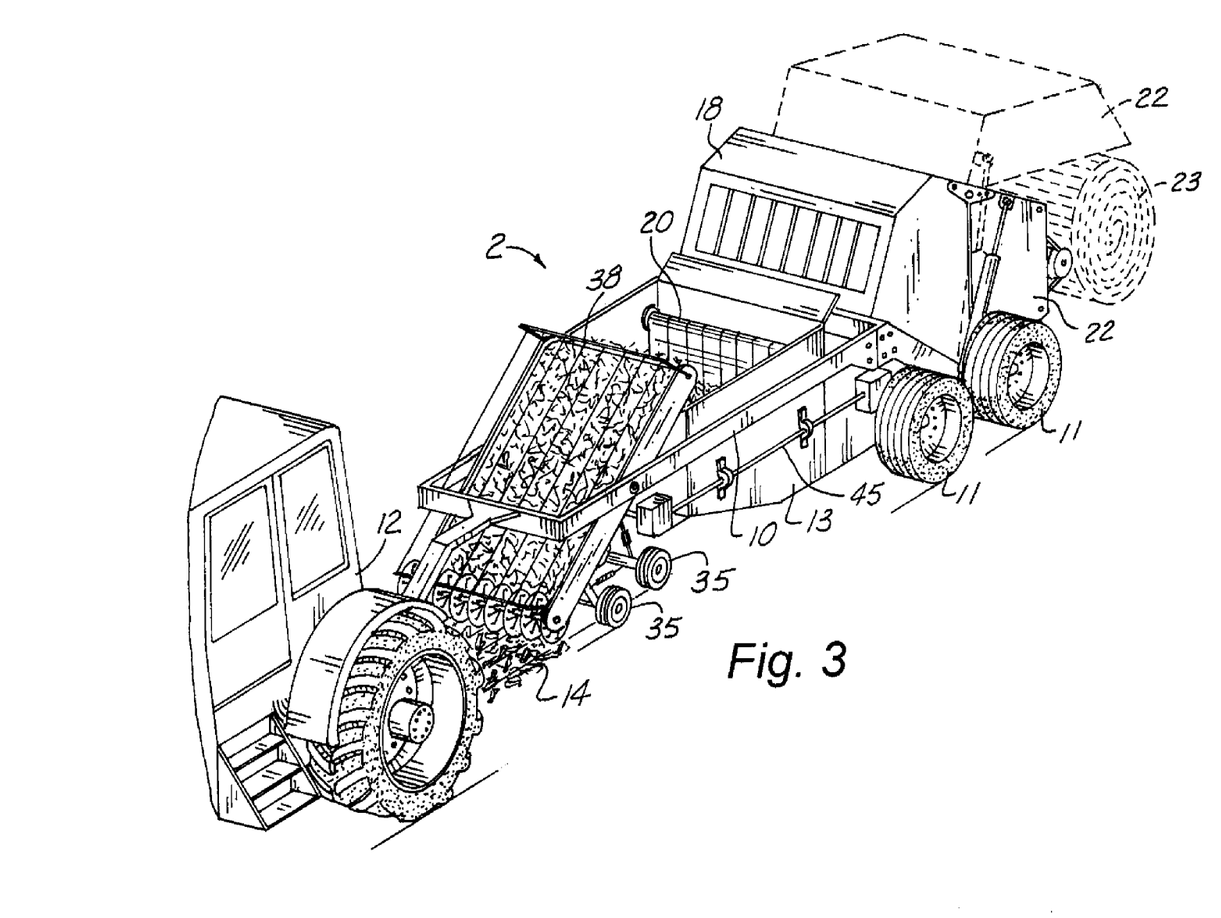
FIG. 3 is a perspective view of another preferred embodiment of a corn stalk baler using a second type of pickup device for transferring cornstalks from the ground to an accumulator portion of the corn stalk baler.
Figure 4:
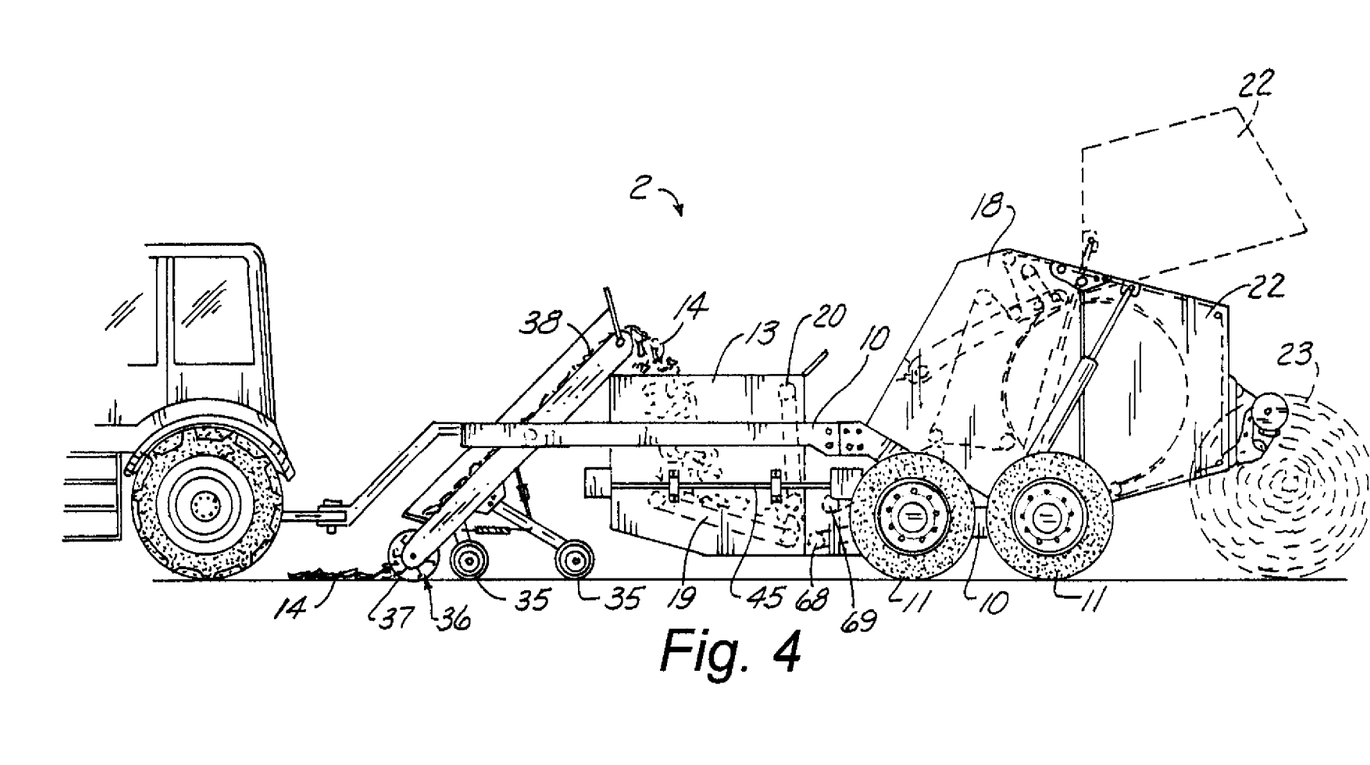
FIG. 4 a side elevational view of the corn stalk baler of FIG. 3 in use and showing in dashed lines a bale being ejected from the baler.

FIGS. 3 and 4 show an alternative preferred embodiment 2 of a corn stalk baler. The preferred embodiment 2 is identical to the embodiment 1 of FIGS. 1 and 2 except that a frame 10 has a different pickup 36 having teeth 37 that are attached to belts 38. This pickup arrangement is well known to those skilled in this art, for example as shown in a hay merging and turning device available on the market from PhiBer Manufacturing, Inc. of Crystal City, Manitoba, Canada, and shown in a brochure attached to the IDS of this document, which brochure is incorporated herein by reference.

Figure 5:
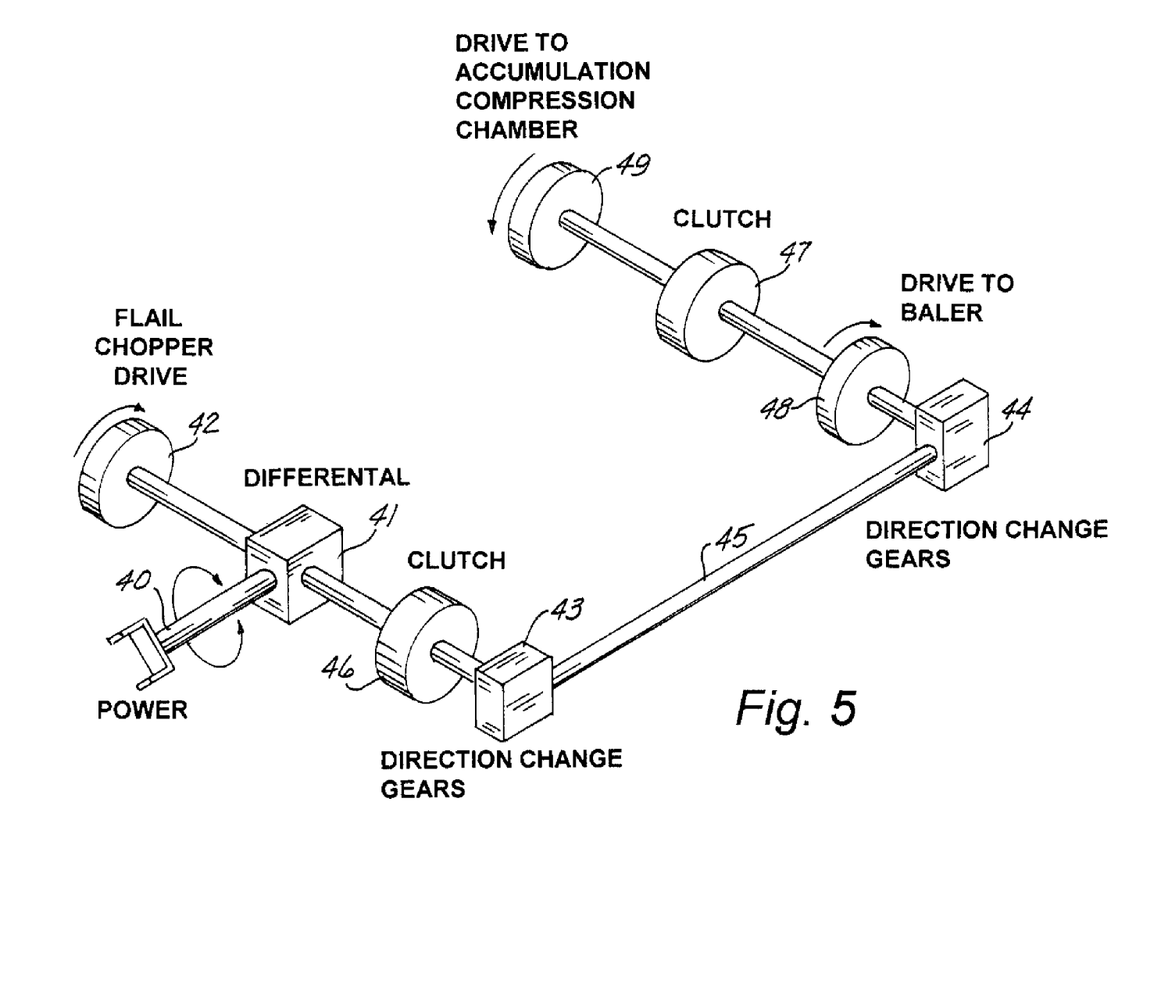
FIG. 5 is a perspective schematic view of a preferred drive train system for operating various parts of the corn stalk baler.

FIG. 5 is a driveline schematic view wherein a tractor power take off (PTO) turns a PTO shaft 40 which powers a gearbox 41, which splits rotational power between a flail chopper drive 42 a baler and accumulator rolls through gear boxes 43 and 44. Accordingly, the operations of baling, chopping and accumulating functions are operating simultaneously to form a bale using clutches 46 and 47, drive 49 to the accumulator 13 compression chamber and a drive 48 to the baler 22. Once the bale is formed, the accumulator rolls 20 can be declutched through clutch 47, allowing the bale net wrap cycle to occur, for example, without feeding any more crop into the inlet of the baler 22 while the bale 23 is being completed and ejected out of the back of the baler as shown in FIGS. 1-4, while at the same time that the bale 23 is being completed the tractor 12 can continue forwardly and the pickup 16 or 36 can continue to transfer crop 14 into the accumulator 13. This is a major advantage over a standard baler, which needs to stop the pickup operation while the bale is being completed and ejected therefrom. To change the system when the embodiments 1 or 2 first begin to pickup crop in a field and the accumulator 13 is empty, the baler 22 and accumulator 13 are declutched, using clutches 46 and 47, to allow the pickup 16 or 36 to fill or pre-charge the accumulator 13.

Figure 6:
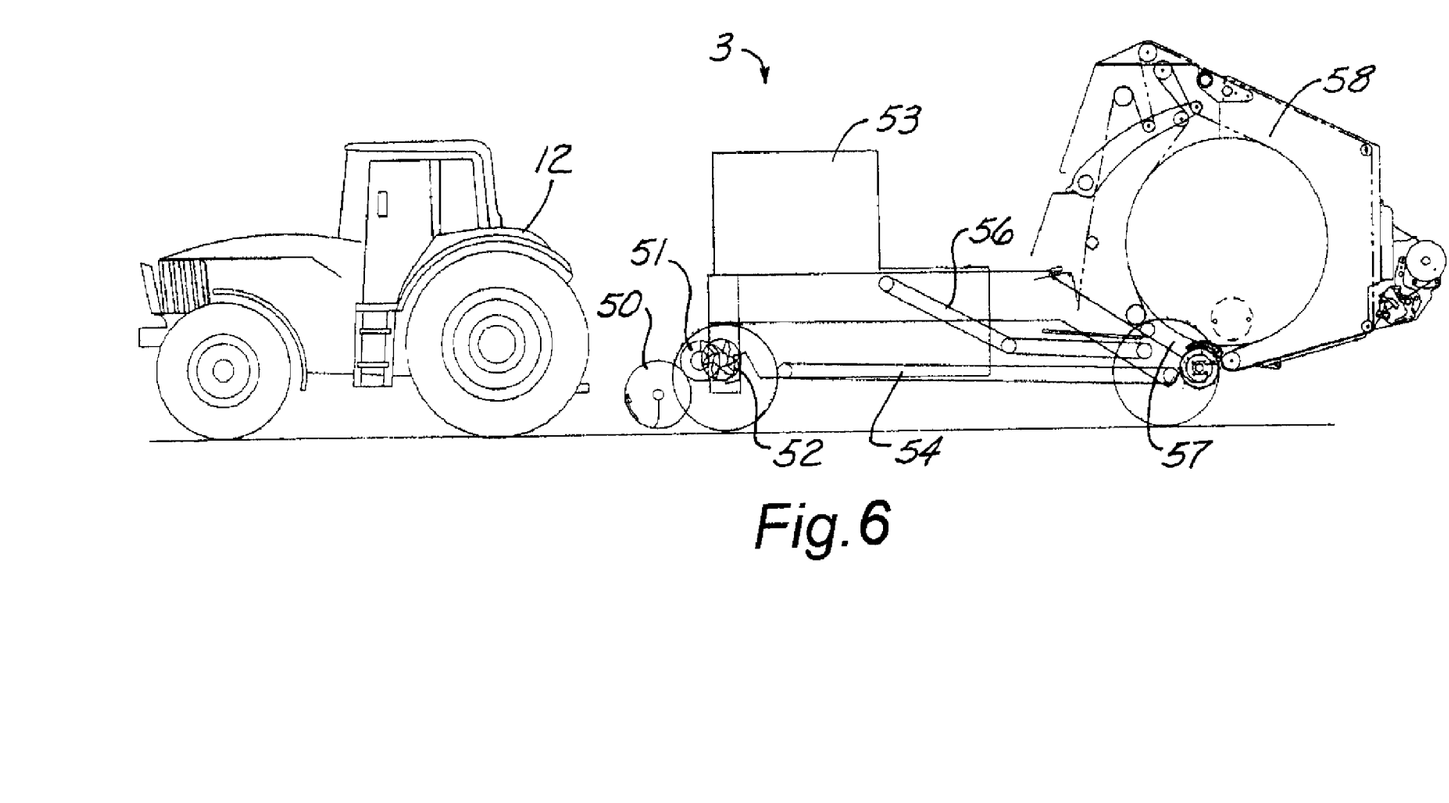
FIG. 6 is a side elevational schematic view of another preferred embodiment of the present invention using a pickup that also chops cornstalks into smaller pieces and transfers the chopped crop to an accumulator.

FIG. 6 shows another alternate embodiment 3 of the present invention with a chopper type pickup 50 which can be like the chopper pickup of U.S. Pat. No. 3,732,672 to Adee et al., and U.S. Pat. No. 3,691,741 to White et al. which both use a one stage pickup/chopper that picks up a crop from the ground and transfers the crop 14 into a stacking wagon. In embodiment 3 however, a pickup teeth device of a type that is like on conventional balers transfers the crop 14 to a powered rotor 52 with blades thereon, which chops the crop and transfers it to the accumulator 53. Then, conveyor belts 54 and 56 move the crop 14 from the accumulator 53 to the inlet 57 of the baler 58. The baler 18 and 58 can, for example, be like the basic baler U.S. Pat. No. 4,910,940 to Meyer, which is incorporated herein by reference in its entirety, though a more modern baler with more modern features can be used instead. Of course in this embodiment 3, it is contemplated that all of the features disclosed above with respect to embodiments 1 and 2 can be used as well if desired.

Figure 7:
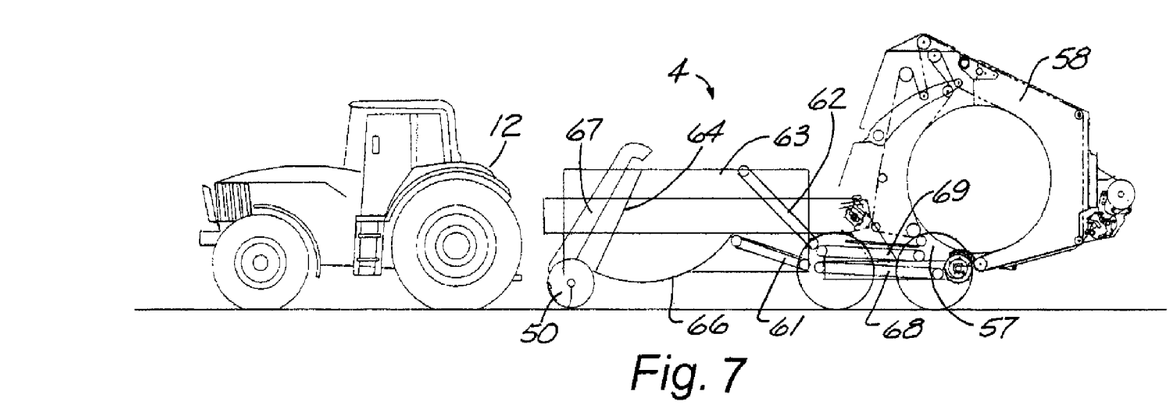
FIG. 7 is a side elevational schematic view of another preferred embodiment of the present invention using a pickup that also chops cornstalks into smaller pieces and throws or blows the chopped crop to an accumulator, with a conveyor plate shown in a position to introduce the chopped corn stalks into an accumulator.
Figure 8:
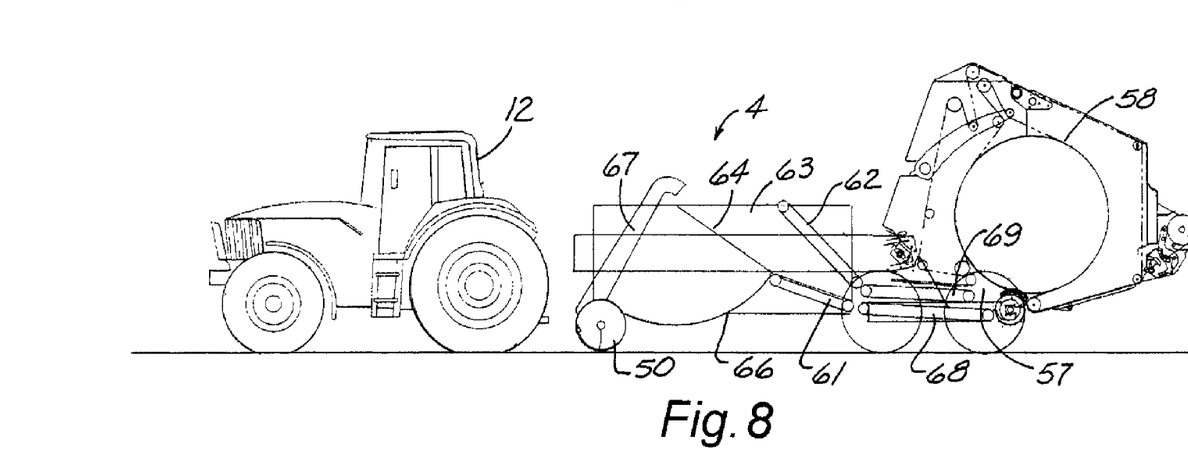
FIG. 8 is a side elevational schematic view of the embodiment shown in FIG. 7, with a conveyor plate shown in a position to have moved all of the chopped corn stalks from the accumulator to the inlet of the baler.

FIGS. 7 and 8 show another preferred embodiment 4 with a chopper type pickup 50 which can be like the chopper pickup of U.S. Pat. No. 3,732,672 to Adee et al., and U.S. Pat. No. 3,691,741 to White et al. This chopper/pickup 50 is a single stage pickup which not only picks up the crop 14 from the ground but chops it and throws or blows the crop 14 upwardly through the chute 67 to the accumulator 63. The accumulator 63 has a bottom disposed along an arc so that rectangular plate 64 can be disposed in the position in FIG. 7 while the accumulator 63 is being filled and then when it is desired to transfer the contents of the accumulator 63 to the inlet 57 of the baler 58, the plate 64 is pivoted from the position shown in FIG. 7 to the position shown in FIG. 8. At the same time that this plate 64 is pivoted from the FIG. 7 to the FIG. 8 position, conveyor belts 61 and 62 are operated to transfer the crop 14 to the space between conveyor belts 68 and 69, which continue to compress the crop 14 and transfer the crop 14 into the inlet 57 of the baler 58. Of course in this embodiment 4, it is contemplated that all of the features disclosed above with respect to embodiments 1 and 2 can be used as well if desired.

Figure 9:
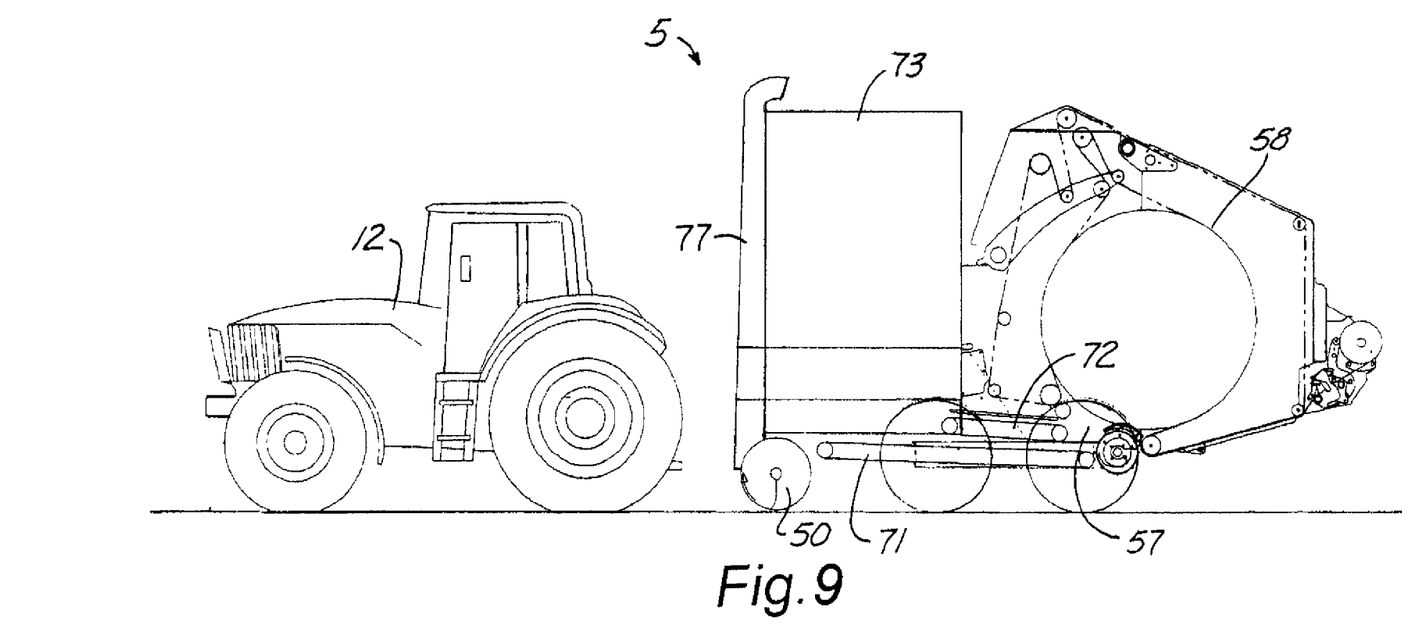
FIG. 9 is a side elevational schematic view of another preferred embodiment of the present invention using a pickup that also chops cornstalks into smaller pieces and transfers the chopped crop to an accumulator, the accumulator having a conveyor belt in the bottom of it for transferring the crop to the inlet of the baler.

FIG. 9 shows another preferred embodiment 5 with a chopper type pickup 50 which can be like the chopper pickup of U.S. Pat. No. 3,732,672 to Adee et al., and U.S. Pat. No. 3,691,741 to White et al. This chopper/pickup 50 is a single stage pickup which not only picks up the crop 14 from the ground but chops it and throws or blows the crop upwardly through the chute 77 to the accumulator 73. The accumulator 73 has a bottom having conveyor belts 71 and 72 are operated to transfer the crop 14 to into the inlet 57 of the baler 58. Of course in this embodiment 5, it is contemplated that all of the features disclosed above with respect to embodiments 1 and 2 can be used as well if desired.

Figure 10:
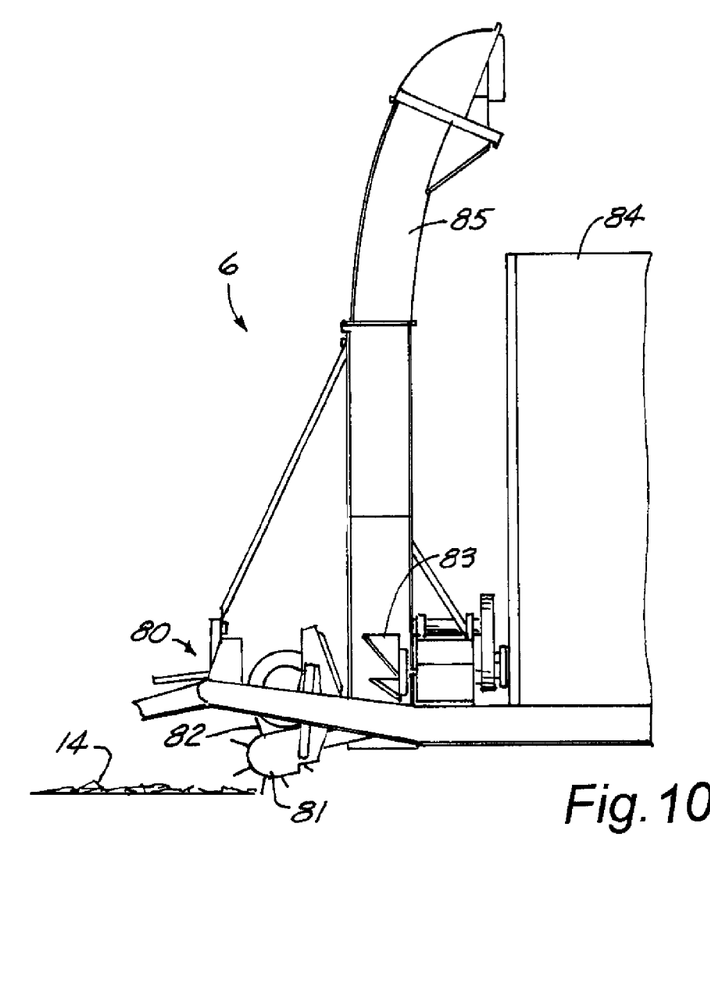
FIG. 10 is a side elevational schematic view of another preferred embodiment of a two stage pickup with a front portion with pickup teeth and a second blower portion for transferring the crop to an accumulator.

FIG. 10 shows the pickup portion only of a preferred embodiment 6. The pickup portion 80 has a front pickup 81 with teeth 82 all of which can be, for example, like U.S. Pat. No. 6,948,300 to Banstra et al., which is incorporated herein by reference in its entirety. A chopper/thrower/blower section 83 can be like U.S. Pat. No. 3,556,327, which has previously been incorporated herein by reference, which can, with the pickup 80 be characterized as a two stage pickup/chopper for picking up the crop 14 and transferring it into an accumulator 84 through a chute 85 similar to embodiments 1-5.

Figure 11:
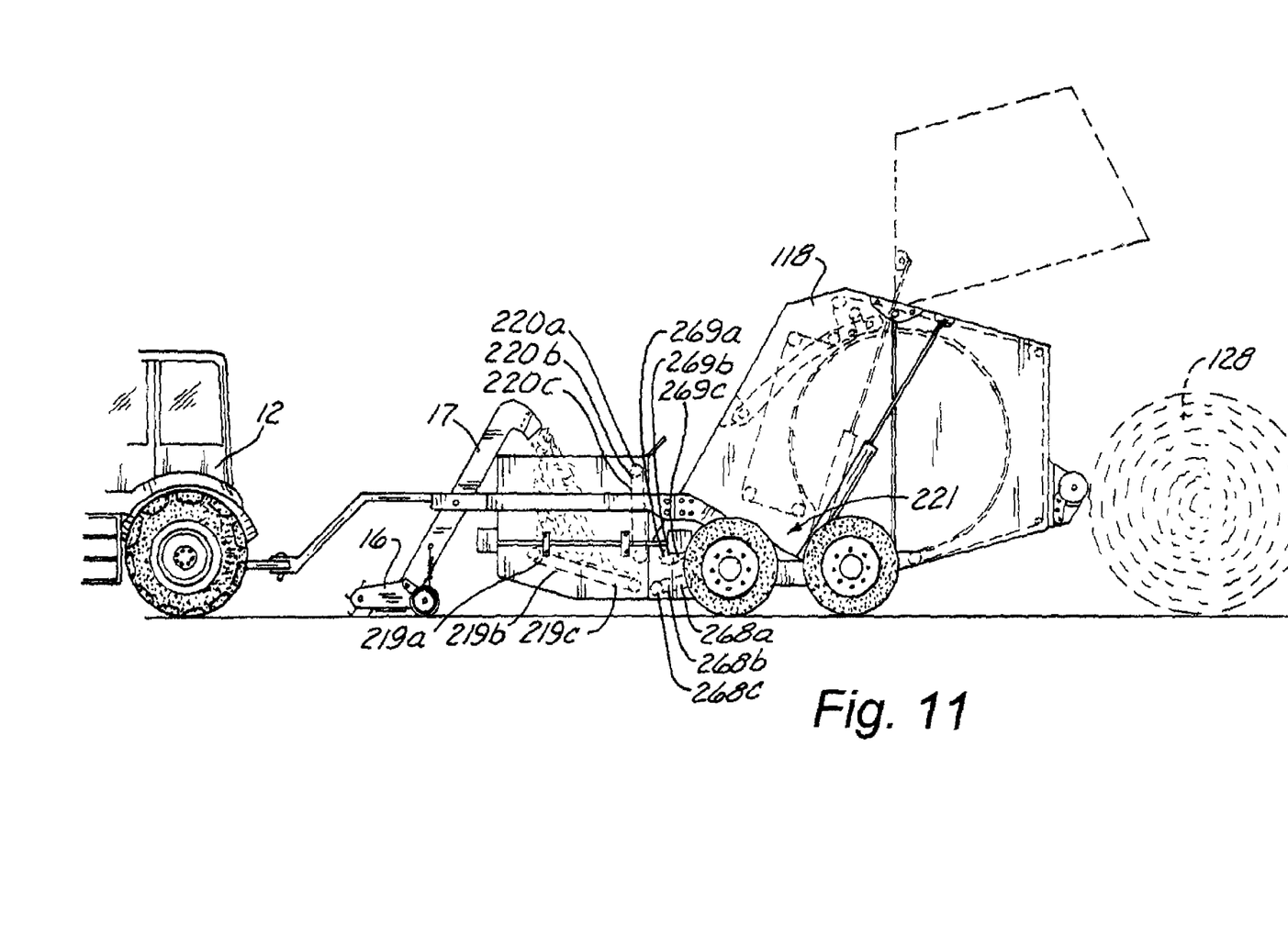
FIG. 11 is a side elevational view of another embodiment of the invention which has a pickup of a predetermined with that is narrower than the width of a bale made in the baler.
Figure 12:
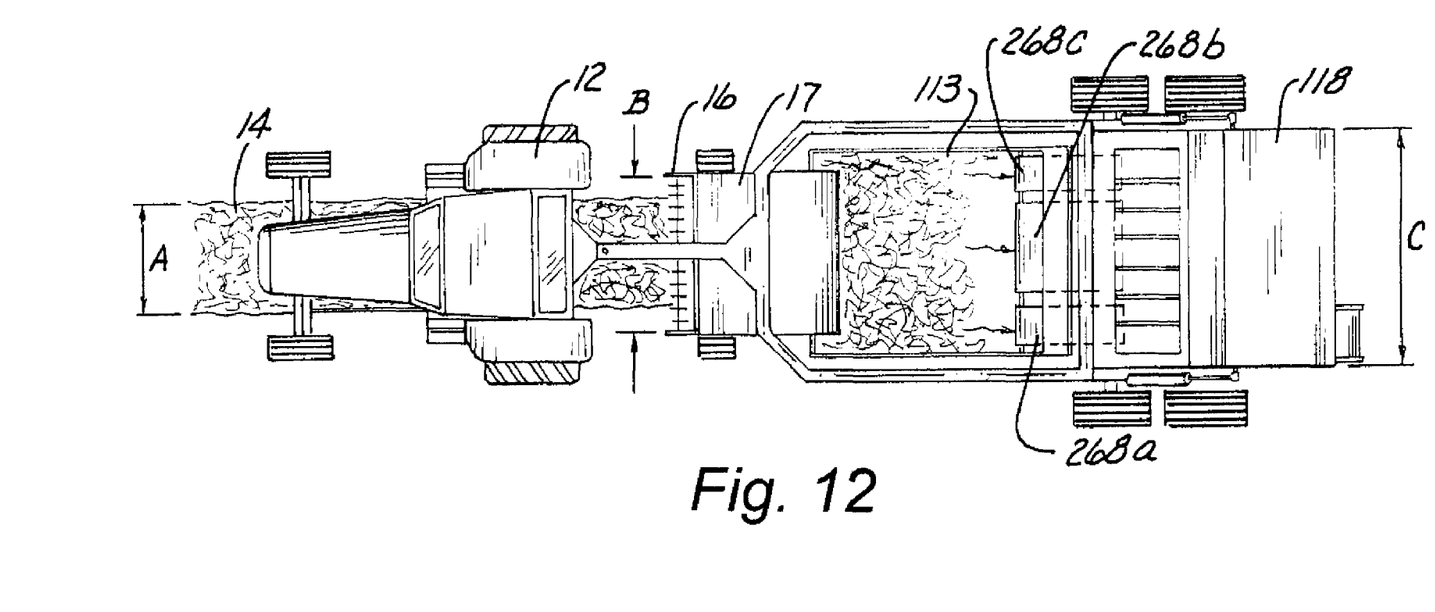
FIG. 12 is a top plan view of the embodiment of the invention shown in FIG. 11 which has a pickup of a predetermined width that is narrower than the width of a bale made in the baler and transfer conveyors from an accumulator to the baler input which are respectively adjustable in speed.

FIGS. 11 and 12 show another embodiment of the invention which has a pickup 16 of a predetermined width (B) that is narrower than the width (C) of a bale 128 made in the baler. The windrow of crop 14 is usually of a width (A) that can vary but is almost always narrower than the width (B) of the pickup 14. The idea of this embodiment is that using an accumulator, the baler 118 can make a bale 128 that is much wider than the predetermined width of the pickup 16. This is possible because the crop 14 is picked up by the pickup 16, which leads to the chopper/blower 17 which fills a wider accumulator than that shown in the FIGS. 1-10 embodiment. Then, sets of conveyors 220*a-c*, 219*a-c*, 268 *a-c* and 269 *a-c* can be used to convey a wider stream of crop material from the accumulator 113 into the inlet 221 of the baler 118 than would be possible without the extra width of the accumulator and corresponding conveyors. FIG. 12 is a top plan view of the embodiment of the invention shown in FIG. 11 which has a pickup 116 of a predetermined width that is narrower than the width of a bale made in the baler and transfer conveyors from an accumulator to the baler input which are respectively adjustable in speed and/or adjustable to be independently turned off or on as needed. Note only one of the sets of transfer conveyors, 268a-c, is illustrated in this FIG. 11. If one part of the baler 118 needs more crop material to make a symmetrical bale, then the amount of crop on each side and in the middle can be adjusted to feed just the right amount of crop material into the baler 118 to accomplish this goal.

Figure 13:
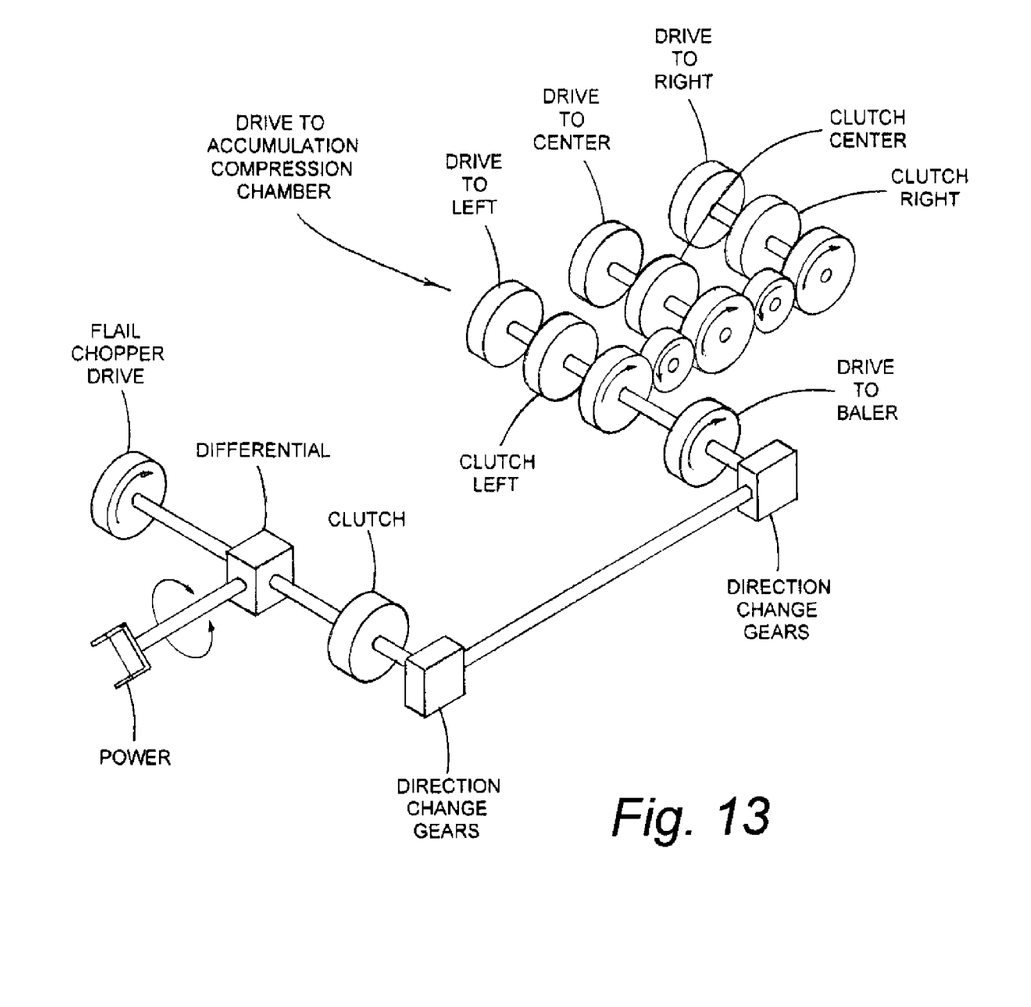
FIG. 13 is a schematic view of the embodiment shown in FIGS. 11 and 12 showing a preferred embodiment of the system for transmitting and controlling the power to the various components thereof.

FIG. 13 is a schematic view of the embodiment shown in FIGS. 11 and 12 showing a preferred embodiment of the system for transmitting and controlling the power to the various components thereof and does not require more description than is shown in FIG. 13 for one of ordinary skill in the art to understand it. Furthermore, it is to be understood that if desired, instead of using multiple clutches, the drive could also be accomplished using a hydraulic pump and three separate hydraulic motors, all of which would be fully equivalent to what is shown in FIG. 13.

The intent for the embodiment of FIGS. 11-13 is to take a windrow 14 of material that is often times four to five feet wide, pick it up with any one of the styles of pickup illustrated in this application (or other equivalent ones of the prior art not illustrated), feed the crop 14 into a holding bin or accumulator 113, and then to feed it out with a transfer mechanism shown as elements 269a-c, 268a-c, 220 a-c and 219a-c to a baler that is for example 96" to 102" wide. The transfer mechanism 120 would ideally include two or three sections. FIGS. 11-13 show three sections a, b and c corresponding to left, middle and right, respectively. The forming bale 128 can be monitored and each of the sections a, b and c respectively driven or stopped as necessary to make sure the forming bale 118 is kept level. This transfer mechanism 220 could work with only two sections, or it may require four or more. The key concept is to have at least two sections, and a control system that controls each section for at least on or off control, but could alternately control speed of each section, in response to a measured feature of the forming bale.

FIGS. 1-10 shows a baler 18 making approximately a six foot (6') diameter bale, and FIGS. 11-13 shows a baler 118 making a ten foot (10') diameter bale 118, which could also be 96 inches to 102 inches wide bale, for example. By using this second embodiment of the invention of FIGS. 11-13, a bale 128 can be made that is much larger in width than heretofore possible while still using other standard equipment such as mowers, mower conditioners and rakes that make conventional size windrows.

Obviously many modifications and variations of the present invention are possible in light of the above teachings. It is therefore to be understood that, within the scope of the appended claims, the invention may be practiced otherwise than as specifically described.

The invention claimed is:

1. An apparatus for baling a crop comprising:
a frame having a front and a rear;
at least one ground engaging wheel operatively attached to the frame for facilitating movement of the frame in a forward direction;
an accumulator operatively attached to the frame for holding said crop in various amounts;
a pickup of a first predetermined width operatively attached to the front of the frame for picking up the crop from a top surface of a field and transferring the crop into the accumulator, the pickup having an inlet and an outlet;
a baler operatively attached to the frame behind the accumulator for transforming a crop into a bale, said baler having an inlet for receiving the crop prior to baling the crop and a baling chamber of a second predetermined width that is significantly larger than said first predetermined width; and
a transfer mechanism for moving the crop in the accumulator to the inlet of the baler wherein the transfer mechanism comprises:
a first transfer mechanism part operatively attached to one side of the accumulator and to one side of the baler inlet for transferring crop from the accumulator to the baler inlet; and
a second transfer mechanism part operatively attached to another side of the accumulator and to another side of the baler inlet for transferring crop from the accumulator to the baler inlet, the second transfer mechanism part being independently operable with respect to the first transfer mechanism part, whereby transferring of the crop from the accumulator to the baler can be selectively different whereby it is easy to make the diameter of the bale the same size on both ends of the bale while the bale is being formed.

2. The apparatus of claim 1 including a third transfer mechanism part operatively attached to another part of the accumulator and to another part of the baler inlet for transferring crop from the accumulator to the baler inlet, the third transfer mechanism part being independently operable, whereby conveying of crop from the accumulator to the baler can be selectively different among the first, second and third transfer mechanism parts for the purpose of attempting to make the diameter of the bale the same size on various parts of the bale while the bale is being made.

3. An apparatus for baling a crop comprising:
a frame having a front and a rear;
at least one ground engaging wheel operatively attached to the frame for facilitating movement of the frame in a forward direction;
an accumulator operatively attached to the frame for holding said crop in various amounts;
a pickup of a first predetermined width operatively attached to the front of the frame for picking up the crop from a top surface of a field and transferring the crop into the accumulator, the pickup having an inlet and an outlet;
a baler operatively attached to the frame behind the accumulator for transforming a crop into a bale, said baler having an inlet for receiving the crop prior to baling the crop and a baling chamber of a second predetermined width that is significantly larger than said first predetermined width; and
a transfer mechanism for moving the crop in the accumulator to the inlet of the baler wherein the transfer mechanism comprises:
a first transfer mechanism part operatively attached to one side of the accumulator and to one side of the baler inlet for transferring crop from the accumulator to the baler inlet, the first transfer mechanism part having at least a selective first speed and a second speed of transfer; and
a second transfer mechanism part operatively attached to another side of the accumulator and to another side of the baler inlet for transferring crop from the accumulator to the baler inlet, the second transfer mechanism part having at least a selective first speed and a second speed of transfer, whereby conveying of crop from the accumulator to the baler can be selectively different for the purpose of attempting to make the diameter of the bale the same size on both ends of the bale while the bale is being made.

4. The apparatus of claim 3 including means for individually adjusting the speed of transfer of crop by the first transfer mechanism part compared to the speed of transfer of the second transfer mechanism part.

5. The apparatus of claim 3 including a third transfer mechanism part operatively attached to another part of the accumulator and to another part of the baler inlet for transferring crop from the accumulator to the baler inlet, the third transfer mechanism part having at least a selective first speed and a second speed of transfer, whereby conveying of crop from the accumulator to the baler can be selectively different among the first, second and third transfer mechanism parts for the purpose of attempting to make the diameter of the bale the same size on various parts of the bale while the bale is being made.

6. An apparatus for baling a crop comprising:

a frame having a front and a rear;

at least one ground engaging wheel operatively attached to the frame for facilitating movement of the frame in a forward direction;

an accumulator operatively attached to the frame for holding said crop in various amounts;

a pickup of a first predetermined width operatively attached to the front of the frame and disposed directly in front of the accumulator for picking up the crop from a top surface of a field and transferring the crop into the accumulator, the pickup having an inlet and an outlet;

a baler operatively attached to the frame behind the accumulator for transforming a crop into a bale, said baler having an inlet for receiving the crop prior to baling the crop and a baling chamber of a second predetermined width that is significantly larger than said first predetermined width and wherein the second predetermined width is at least twenty percent larger than the first predetermined width;

a transfer mechanism for moving the crop in the accumulator to the inlet of the baler; and wherein the first predetermined width of the pickup is within a range of four to five feet and the second predetermined width of the baling chamber is within a range of eight to twelve feet.

7. An apparatus for baling a crop comprising:

a frame having a front and a rear;

at least one ground engaging wheel operatively attached to the frame for facilitating movement of the frame in a forward direction;

an accumulator operatively attached to the frame for holding said crop in various amounts;

a pickup of a first predetermined width operatively attached to the front of the frame and disposed directly in front of the accumulator for picking up the crop from a top surface of a field and transferring the crop into the accumulator, the pickup having an inlet and an outlet;

a baler operatively attached to the frame behind the accumulator for transforming a crop into a bale, said baler having an inlet for receiving the crop prior to baling the crop and a baling chamber of a second predetermined width that is significantly larger than said first predetermined width and wherein the second predetermined width is at least twenty percent larger than the first predetermined width;

a transfer mechanism for moving the crop in the accumulator to the inlet of the baler; and wherein the first predetermined width of the pickup is within a range of four to five feet and the second predetermined width of the baling chamber is within a range of eight to ten feet.

* * * * *